(12) United States Patent
Kubota et al.

(10) Patent No.: US 8,848,329 B2
(45) Date of Patent: Sep. 30, 2014

(54) POSITION DETECTING DEVICE (71) Applicant: Denso Corporation, Kariya (JP)

(72) Inventors: Takamitsu Kubota, Chiryu (JP); Yoshiyuki Kono, Obu (JP); Toru Shimizu, Nagoya (JP)

(73) Assignee: Denso Corporation, Kariya (JP)

( * ) Notice: Subject to any disclaimer, the term of this patent is extended or adjusted under 35 U.S.C. 154(b) by 169 days.

(21) Appl. No.: 13/691,985

(22) Filed: Dec. 3, 2012

(65) Prior Publication Data
US 2013/0155562 A1 Jun. 20, 2013

(30) Foreign Application Priority Data
Dec. 19, 2011 (JP) .................... 2011-276859

(51) Int. Cl.
| | |
|---|---|
| *H02H 3/00* | (2006.01) |
| *B60K 37/02* | (2006.01) |
| *F02D 11/10* | (2006.01) |
| *H02H 3/20* | (2006.01) |
| *G01D 5/14* | (2006.01) |
| *G01D 5/244* | (2006.01) |
| *H02H 3/24* | (2006.01) |

(52) U.S. Cl.
CPC .................. *H02H 3/20* (2013.01); *B60K 37/02* (2013.01); *B60W 2510/0604* (2013.01); *F02D 11/106* (2013.01); *H02H 3/202* (2013.01); *G01D 5/145* (2013.01); *G01D 5/24428* (2013.01); *F02D 2200/0404* (2013.01)

USPC ................ 361/91.5; 361/78; 361/79; 361/88; 361/90

(58) Field of Classification Search
USPC ......................................................... 361/91.5
See application file for complete search history.

(56) References Cited

U.S. PATENT DOCUMENTS

| | | | |
|---|---|---|---|
| 5,544,000 A | 8/1996 | Suzuki et al. | |
| 6,407,543 B1 | 6/2002 | Hagio et al. | |
| 8,487,578 B2 * | 7/2013 | Kubota et al. ................. | 318/563 |
| 2004/0124818 A1 * | 7/2004 | Dequina et al. ............... | 323/282 |
| 2009/0058378 A1 * | 3/2009 | Chee ............................. | 323/238 |

FOREIGN PATENT DOCUMENTS

| | | |
|---|---|---|
| JP | 6-042907 | 2/1994 |
| JP | 9-321598 | 12/1997 |
| JP | 2004-004114 | 1/2004 |
| JP | 2007-202290 | 8/2007 |
| JP | 2009-115736 | 5/2009 |

\* cited by examiner

*Primary Examiner* — Dharti Patel
(74) *Attorney, Agent, or Firm* — Nixon & Vanderhye PC (57) ABSTRACT

A high-side output transistor and a low-side output transistor of an output circuit control voltages of conductors, which connect a power supply terminal and ground, and outputs a voltage signal to an output terminal through an output conductor. A voltage output circuit detects a voltage applied to the high-side output transistor based on a potential difference of a first resistor provided closer to the output terminal side. A comparator circuit outputs a signal to turn off a first switch and a second switch provided in the conductors, when the output voltage of the voltage output circuit exceeds a reference voltage Vr.

7 Claims, 6 Drawing Sheets

POSITION DETECTING DEVICE

CROSS REFERENCE TO RELATED APPLICATION

This application is based on and incorporates herein by reference Japanese patent application No. 2011-276859 filed on Dec. 19, 2011.

TECHNICAL FIELD

The present disclosure relates to a position detecting device for detecting a rotation angle or a stroke of a movable body.

BACKGROUND

A conventional position detecting device for a vehicle detects a rotation angle (angular position) of a throttle valve provided in an electronic throttle apparatus (electronically-controlled throttle), a rotation angle of an accelerator pedal provided in an accelerator pedal module or a stroke (linear position) of a clutch actuator.

JP 2004-4114A (U.S. Pat. No. 6,407,543) discloses a magnetic detector module provided as a position detecting device provided in an electronic throttle apparatus. The magnetic detector module is an electronic device, in which a magnetic detecting element and an integrated circuit (IC) for processing an output signal of the magnetic detecting element are integrated in a single unit. The magnetic detector module detects the rotation angle of the throttle valve by detecting a magnetic field generated by magnets provided in the throttle valve by the magnetic detecting element. An electronic control unit (ECU) electrically connected to the electronic throttle apparatus supplies current to a motor, which drives the throttle valve to rotate, in accordance with the output signal of the magnetic detector module.

According to the conventional electronic throttle apparatus, terminals of the magnetic detector module and motor terminals are arranged adjacently at a connector part, where the magnetic detector module and the ECU output or input signals or currents relative to the ECU. If water or a conductive particle enters the connector part, the terminals of the magnetic detector module and the motor terminals tend to be short-circuited. To counter this problem, output terminals of the magnetic detector module are not located at the position, which is most adjacent to the motor terminal. A ground terminal or a power supply terminal of the magnetic detector module is located at such a position distanced from the motor terminal. Thus the integrated circuit of the magnetic detector module is protected from adverse influence generated when the terminal of the magnetic detector module and the motor terminal short-circuit. However, since the terminals of the magnetic detector module need be located in a limited area in the connector part, the terminals of the magnetic detector module cannot be freely located. If two magnetic detector modules are provided in the electronic throttle apparatus, locations of such magnetic detector modules are limited.

SUMMARY

It is an object to provide a position detecting device, which is capable of protecting an output circuit from an abnormal voltage applied to an output terminal.

According to one aspect, a position detecting device is provided for detecting a position of a movable body. The position detecting device includes a detector element, a signal processing circuit and an output circuit. The detector element outputs a signal varying with movement of the movable body. The signal processing circuit processes the signal outputted from the detector element. The output circuit outputs a signal from an output terminal based on a signal outputted from the signal processing circuit.

The output circuit includes an output transistor, a control circuit, an output conductor, a voltage detection circuit and a current shut-off circuit. The output transistor is connected in series in a conductor connecting a power supply terminal and ground and controls a voltage of the conductor to be outputted from the output terminal. The control circuit controls the output transistor based on the signal outputted from the signal processing circuit. The output conductor has one end connected to the conductor including the output transistor therein and an other end connected to the output terminal. The voltage detection circuit detects a voltage applied from the output terminal to the output transistor. The current shut-off circuit shuts off electric conduction between the output terminal and the output transistor, when the voltage detection circuit detects that a voltage higher than a withstand voltage of the output transistor is applied to the output transistor.

BRIEF DESCRIPTION OF THE DRAWINGS

The above and other objects, features and advantages of a position detecting device will become more apparent from the following detailed description made with reference to the accompanying drawings: In the drawings.

EMBODIMENT (First Embodiment)

A position detecting device according to a first embodiment is shown in FIG. 1 to FIG. 4.

The position detecting device is provided as a magnetic detector module 2, which is used in an electronic throttle apparatus 1 for controlling an amount of air suctioned into cylinders of an internal combustion engine of a vehicle. The magnetic detector module 2 outputs a voltage signal indicative of an open angle of a throttle valve 3 to an electronic control unit (ECU) 4 of the vehicle. The ECU 4 outputs a drive signal to a motor 5, which drives the throttle valve 3, so that the throttle valve 3 is rotated to an angular position (open angle) suitable for an operating condition of the engine. Thus the motor 5 drives the throttle valve 3 to a target angular position and regulates the amount of suction air.

Figure 1:
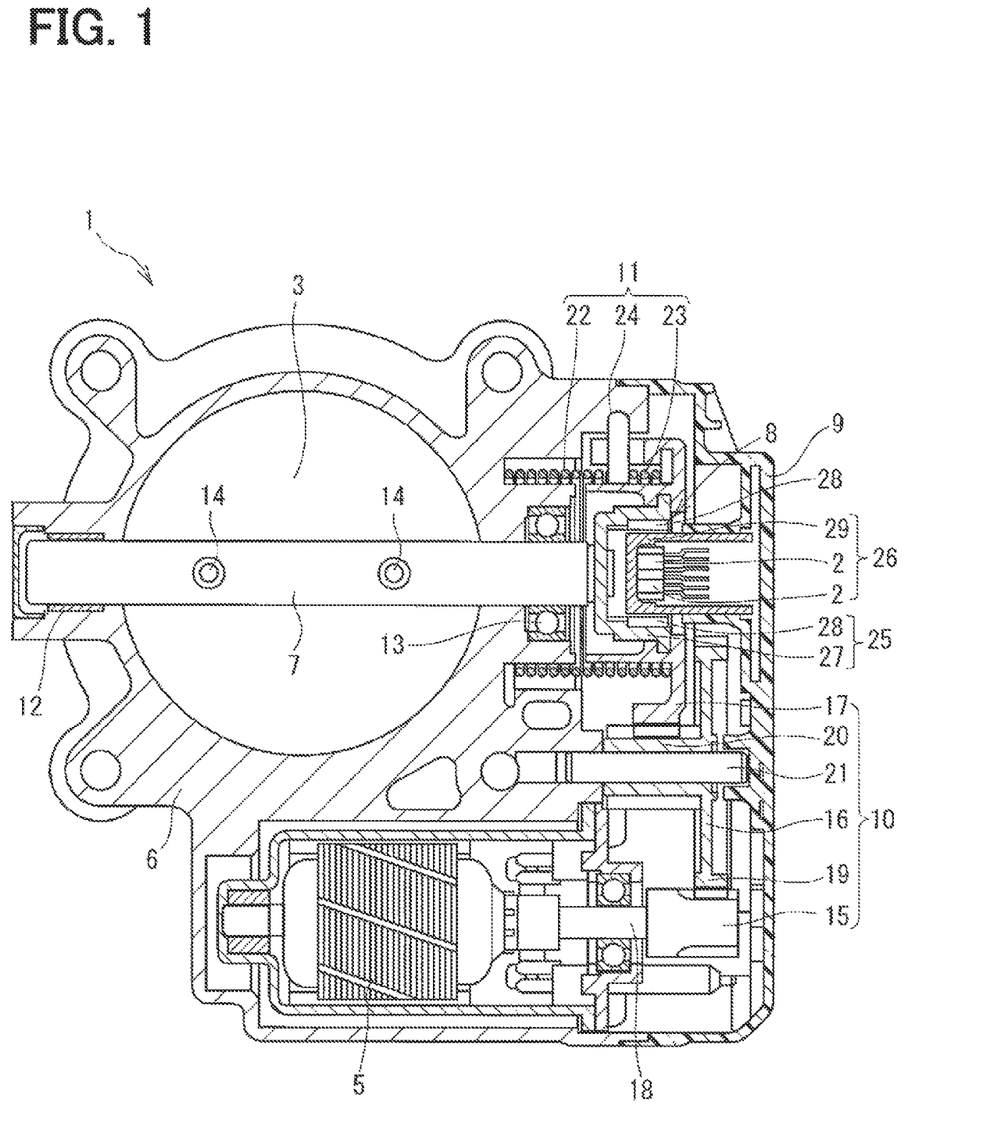
FIG. 1 is a sectional view of an electronic throttle apparatus provided with a position detecting device according to a first embodiment.

The electronic throttle apparatus 1 is configured as described below. The electronic throttle apparatus 1 includes, as shown in FIG. 1, a throttle body 6, a throttle shaft 7, the throttle valve 3, the motor 5, a rotation angle detector 8 and the like. The throttle body 6 has an air passage, which communicates with a passage of an intake pipe and has a generally cylindrical shape in section. A cover 9 is attached to an outer wall of the throttle body 6. A gear reduction device 10, a spring device 11 and the rotation angle detector 8 are accommodated in a space provided between the throttle body 6 and the cover 9.

The throttle shaft 7 is supported rotatably relative to the throttle body 6 by bearings 12 and 13. The throttle valve 3 is a butterfly rotary valve, which regulates an open area of the air passage formed in the throttle body 6. The throttle valve 3 and the throttle shaft 7 are fixed by fixing members 14. The throttle valve 3 is thus rotatable with the throttle shaft 7 and varies the open area of the air passage thereby to regulate the amount of air suctioned into the cylinders of the engine. The throttle valve 3 is a movable body.

The motor 5 is a DC motor, which switches over direction of rotation corresponding to direction of current supplied thereto and generates rotation torque corresponding to the amount of supplied current. The motor 5 is accommodated within an accommodation space provided in the throttle body 6. The motor 5 is dive-controlled by commands from the ECU 4.

The gear reduction device 10 transfers the rotation torque generated by the motor 5 to the throttle valve 3 after speed reduction. The gear reduction device 10 is formed of a pinion gear 15, an intermediate gear 16, a gear rotor 17 and the like. The pinion gear 15 is fixed to an output shaft 18 of the motor 5 to be rotated by the motor 5. The intermediate gear 16 has a large-diameter gear 19 and a small-diameter gear 20, which are coaxial. The intermediate gear 16 is provided rotatably by a support shaft 21, which is supported by the throttle body 6 and the cover 9. The large-diameter gear 19 is meshed with the pinion gear 15. The small-diameter gear 20 is meshed with the gear rotor 17. The gear rotor 17 is fixed to an axial end of the throttle shaft 7 to be rotated with the throttle shaft 7.

The spring device 11 biases the throttle valve 3 to take the open angle position at an intermediate position between a fully-closed position (minimum rotation angle) and a fully-open position (maximum rotation angle) when the current supply to the motor 5 is shut off. Thus, the vehicle is enabled to make limp-home travel. The spring device 11 includes a return spring 22, a default spring 23 and a fixing member 24. The return spring 22 biases the throttle valve 3 in a valve closing direction. The default spring 23 biases the throttle valve 3 in a valve opening direction. The return spring 22 and the default spring 23 are integral and wound in opposite directions, while sandwiching the fixing member 24.

The rotation angle detector 8 detects a rotation angle of the throttle valve 3 and outputs a voltage signal, which varies with the open angle of the throttle valve 3. The detector 8 is formed of a cylindrical magnetic generator part 25 and a magnetic detector part 26. The magnetic generator part 25 rotates integrally with the throttle valve 3. The magnetic detector part 26 is provided radially inside the magnetic generator part 25 without contacting the magnetic generator part 25. The magnetic generator part 25 includes a cylindrical yoke 27 and two magnets 28 and is insert-molded in the gear rotor 17. The magnets 28 are arranged to oppose each other in the radial direction at a radially inside surface of the yoke 27 to provide magnetic field, which is perpendicular to the rotation shaft of the throttle valve 3.

Figure 2:
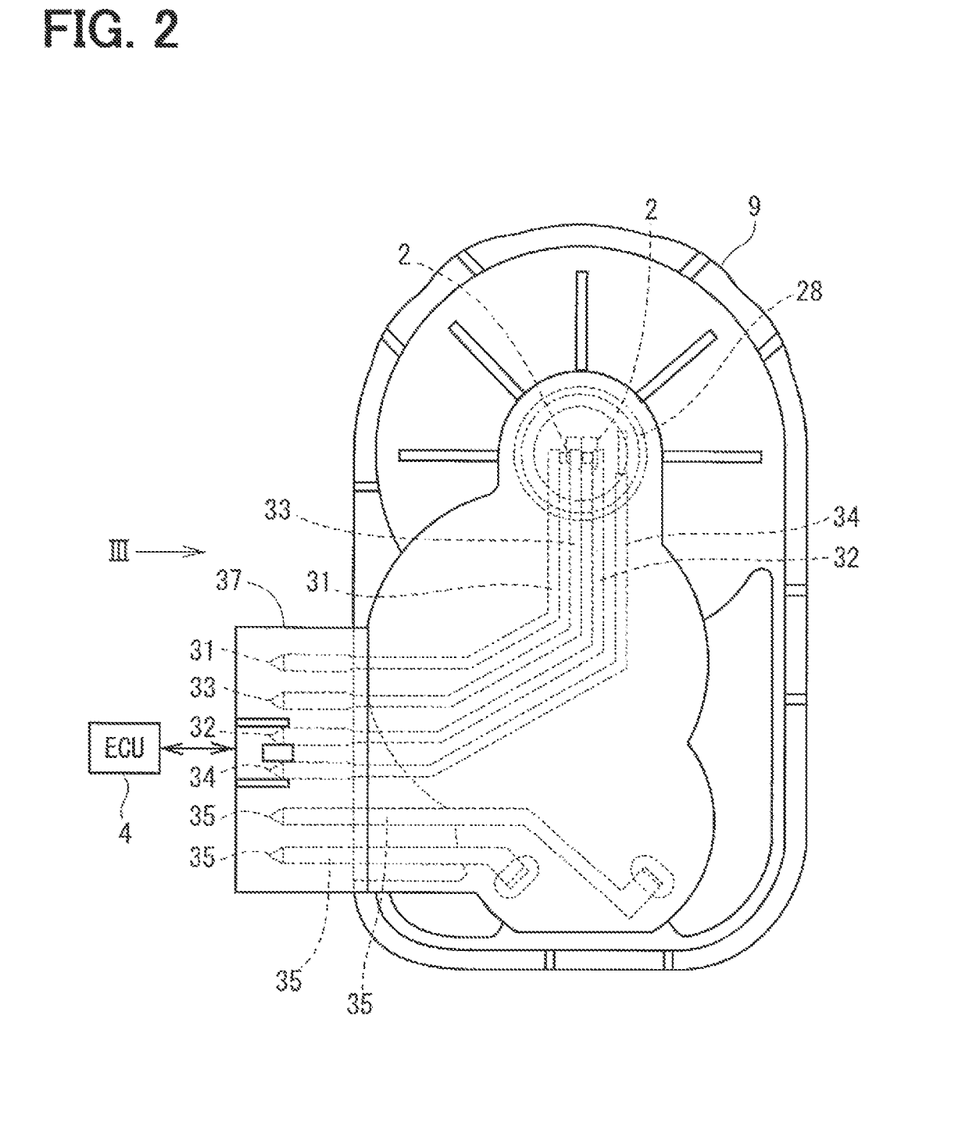
FIG. 2 is a plan view of a cover of the electronic throttle apparatus shown in FIG. 1.

The magnetic detector part 26 includes a stator core 29 and two magnetic detector modules 2. The magnetic detector part 26 is fixed to the cover 9. The magnetic detector module 2 forms the position detecting device. The stator core 29 is formed of a generally cylindrical body and has a magnetism detection gap in a diameter direction. The magnetic detector modules 2 are located in the magnetic detection gap. The magnetic detector module 2 is an electronic unit, which integrates therein a magnetic detector element 30 and an integrated circuit (IC) for processing a signal outputted from the magnetic detector element 30. The magnetic detector element 30 may be a Hall element or a magneto-resistive element, for example. When the magnetic generator part 25 and the magnetic detector part 26 make a relative rotation therebetween, the density of magnetic flux passing through a magnetic sensing surface of the magnetic detector element 30 varies. The magnetic detector module 2 outputs a voltage signal, which corresponds to the magnetic flux density in the magnetic sensing surface of the magnetic detector element 30, to the ECU 4 (FIG. 2). The ECU 4 feedback-controls the motor 5 so that the throttle open angle detected by the magnetic detector module 2 and indicated by the voltage signal of the magnetic detector module 2 matches the target open angle set in accordance with the operating condition of the engine.

Figure 3:
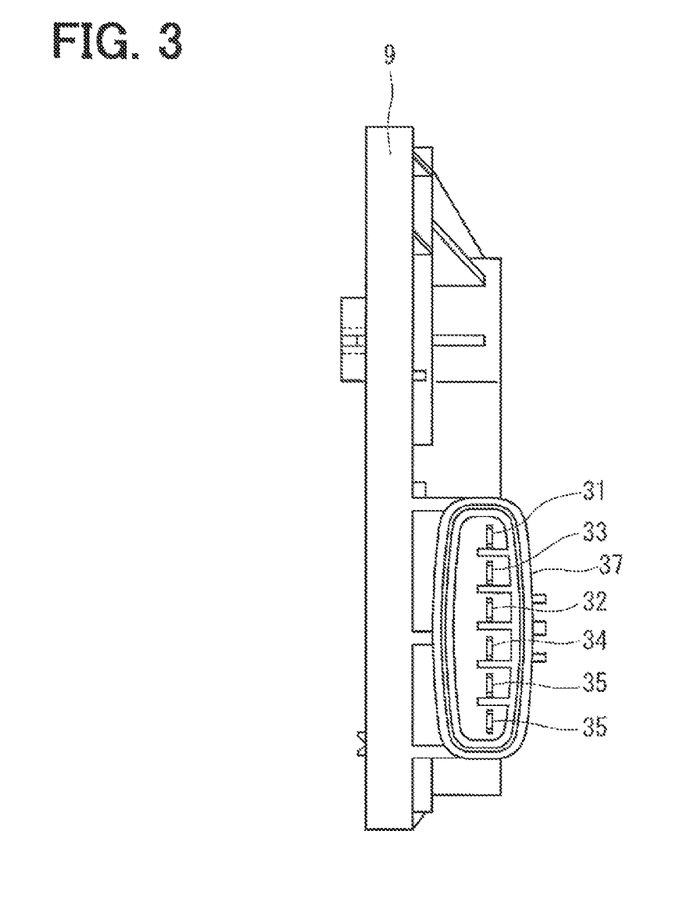
FIG. 3 is a side view of the electronic throttle apparatus viewed in a direction III in FIG. 2.

As shown in FIG. 2 and FIG. 3, output terminals 31, 32, a power supply terminal 33 and a ground terminal 34 of the magnetic detector modules 2 are resin-molded in the cover 9. The power supply terminal 33 is common to the magnetic detector modules 2 and the ground terminal 34 is also common to the magnetic detector modules 2. The motor terminals 35 for supplying power (for example, 12 V) to the motor 5 are resin-molded in the cover 9. The terminals 31 to 34 of the magnetic detector modules 2 and the motor terminals 35 are arranged in one connector part 37. The terminals 31 to 34 of the two magnetic detector modules 2 are arranged in the order of the output terminal 31 of one magnetic detector module 2, the common power supply terminal 33, the output terminal 32 of the other magnetic detector module 2 and the common ground terminal 34 from top to bottom direction in FIG. 3. That is, the power supply terminal 33 or the ground terminal 34 is located between the motor terminal 35 and the output terminal 31 or 32 of the magnetic detector module 2. That is, the power supply terminal 33 or the ground terminal 34 is located immediately adjacent to the motor terminal 35. This arrangement is for reducing adverse influence, which the integrated circuit of the magnetic detector module 2 suffers from, when the motor terminal 35 and the output terminal of the magnetic detector module 2 adjacent to the motor terminal 35 short due to water or a conductive foreign particle entering the connector part 37.

However, according to the first embodiment, the terminals 31 to 34 of the two magnetic detector modules 2 may be located with more freedom in accordance with the location of the magnetic detector modules 2 owing to the circuit configuration described below with reference to FIG. 4 and FIG. 5. That is, the output terminals 31 and 32 of the magnetic detector modules 2 can be located at the position (position of the ground terminal 34 in FIG. 2 and FIG. 3), which is immediately adjacent to the motor terminal 35. The motor terminal 35 may also be located with more freedom without being limited by the position of the terminal of the magnetic detector module 2.

Figure 4:
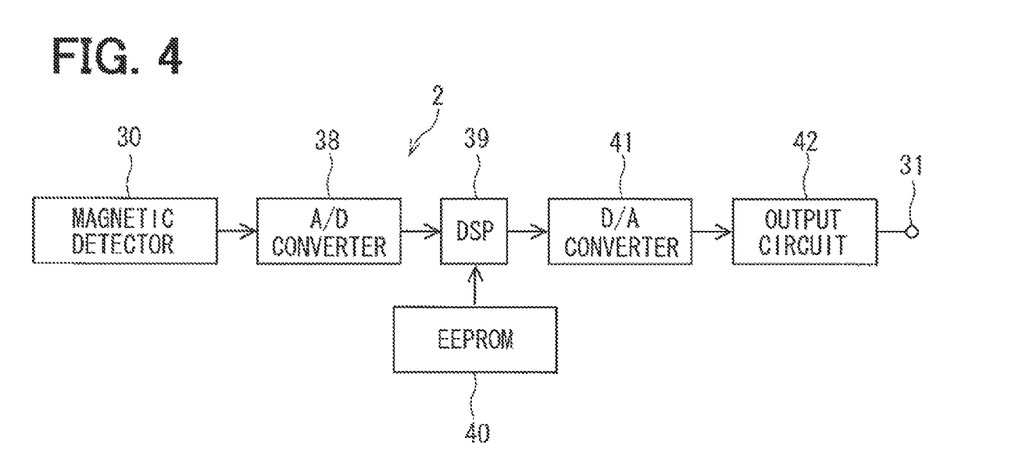
FIG. 4 is a block diagram of an electronic circuit of the position detecting device according to the first embodiment.

The magnetic detector module 2 is configured as shown in FIG. 4. The voltage signal outputted from the magnetic detector element 30 and varying with the density of magnetic flux passing through the magnetic detector element 30 is converted to a digital signal by an A/D converter 38 and inputted to a digital signal processor (DSP) 39. The digital signal is subjected to offset adjustment, gain adjustment and clamp adjustment by the DSP 39 in accordance with predetermined values stored in an EEPROM 40. The offset adjustment determines an offset of an output voltage signal, which is outputted to the ECU 4, relative to the open angle of the throttle valve 3. The gain adjustment determines an inclination (proportional gain) of the output voltage signal relative to the open angle of the throttle valve 3. The clamp adjustment determines a maximum value and a minimum value of the output voltage signal. The digital value adjusted by the DSP 39 is converted to an analog signal by a D/A converter 41 and inputted to an output circuit 42 to be outputted to the ECU 4 as the output voltage signal. The A/D converter 38, the DSP 39, the EEPROM 40 and the D/A converter 41 form a signal processing circuit.

Figure 5:
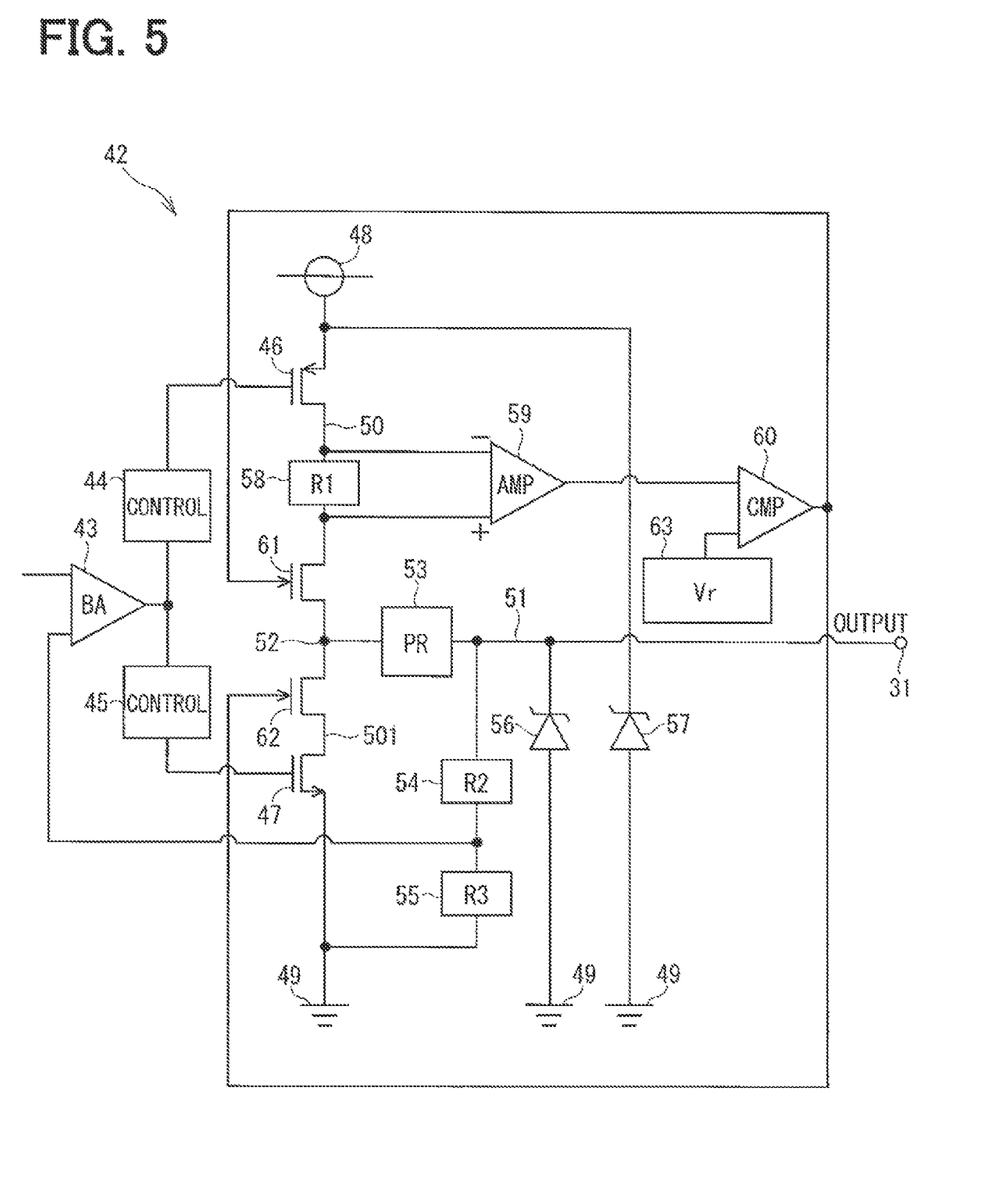
FIG. 5 is a circuit diagram of an output circuit of the position detecting device according to the first embodiment.

The output circuit 42 is configured as shown in FIG. 5. The output voltage signal of the D/A converter 41 is inputted to a buffer amplifier 43. The buffer amplifier 43 amplifies the inputted signal thereby to remove mutual influence with circuits of the ECU 4. A high potential side (high-side) output transistor 46 and a low potential side (low-side) output transistor 47 are controlled by two control circuits 44 and 45, respectively, in response to a signal outputted from the buffer amplifier 43. The high-side output transistor 46 and the low-side output transistor 47 are connected in series with a first conductor 50 and a second conductor 501, which connect a power supply terminal (for example, 5 V) 48 and ground 49. The conductors 50 and 501 are connected to the output terminal 31 by an output conductor 51. The output conductor 51 has one end connected to a junction 52 between the conductors 50 and 501 connecting the power supply terminal 48 and the ground 49. The output conductor 51 has the other end connected to the output terminal 31. The high-side output transistor 46 is provided in the conductor 50, which is closer to the power supply terminal 48 than the junction 52 is to the power supply terminal 48. The low-side output transistor 47 is provided in the conductor 501, which is closer to the ground 49 than the junction 52 is to the ground. The current flowing in the high-side output transistor 46 is controlled by the control circuit 44. The current flowing in the low-side output transistor 47 is controlled by the control circuit 45. Thus the voltage at the output conductor 51 is regulated. As a result, a voltage signal, which corresponds to the voltage signal outputted from the buffer amplifier 43, is outputted from the output terminal 31 through the output conductor 51.

A protective resistor 53 is provided in the output conductor 51. The protective resistor 53 protects the high-side output transistor 47, the low-side output transistor 47, the control circuits 44, 45 and the like, by its voltage drop, when an abnormal voltage is applied to the output terminal 31. A second resistor 54 and a third resistor 55 are provided at an output terminal side of the protective resistor 53. The second resistor 54 is provided in a negative feedback path connecting the output terminal side of the protective resistor 53 to the buffer amplifier 43. Thus the gain of the buffer amplifier 43 is determined. A first protective element 56 such as a Zener diode is provided in a conductor connecting the output conductor 51 and the ground 49. The first protective element 56 conducts the current from the output terminal 31 to the ground 49, when a voltage (for example, 15 V) higher than the voltage (for example, 12 V) supplied to the motor terminal 35, which is adjacent to the terminal of the magnetic detector module 2 in the connector part 37, is applied to the output terminal 31. A second protective element 57 such as a Zener diode is provided in a conductor connecting the power supply terminal 48 and the ground 49. The second protective element 57 conducts the current from the power supply terminal 48 to the ground 49, when a voltage (for example, 15 V) higher than the voltage supplied to the motor terminal 35 is applied to the power supply terminal 48.

In addition, a protection circuit is specifically provided for protecting the output transistors 46, 47 of the output circuit 42, the control circuits 44, 45 and the like when the output terminal 31 and the motor terminal 35 are shorted.

This protection circuit will be described below. The output circuit 42 is provided with a first resistor 58, a voltage output circuit 59, a comparator circuit 60, a first switch 61 and a second switch 62. The first resistor 58 is provided in the conductor 50 between the protective resistor 53 and the high-side output transistor 46. The voltage output circuit 59 outputs a detection voltage indicative of a voltage applied to the high-side output transistor 46 based on a potential difference of the first resistor 58, that is developed between both ends of the first resistor 58. The voltage applied to the high-side output transistor 46 is detectable based on the potential difference of the first resistor 58, because resistances of the protective resistor provided in the circuit between the power supply terminal 48 and the output terminal 31, the first switch 61, the first resistor 58 and the high-side output transistor 46 are fixed. That is, the voltage applied to the high-side output transistor 46 is detectable by amplifying the potential difference of the first resistor 58 in accordance with a ratio of resistances of the first resistor 58 and the high-side output transistor 46. Thus the first resistor 58 and the voltage output circuit 59 detect the voltage applied to the high-side output transistor 46 when the voltage (for example, 12 V) of the motor terminal 35 is applied to the output terminal 31 due to the short-circuit between the output terminal 31 and the motor terminal 35. The first resistor 58 and the voltage output circuit 59 form a voltage detection circuit.

The comparator circuit 60 compares the voltage outputted from the voltage output circuit 59 with a reference voltage Vr generated by a reference voltage generator 63. The reference voltage Vr is set to be lower than withstand voltages of the high-side output transistor 46 and the low-side output transistor 47. That is, the reference voltage Vr is determined such that the output voltage of the voltage output circuit 59 becomes higher than the reference voltage Vr when the voltage applied to the high-side output transistor 46 exceeds the withstand voltage of the high-side output transistor 46. The reference voltage Vr is set preferably to be lower by a predetermined margin than the withstand voltages of the high-side output transistor 46 and the low-side output transistor 47.

The first switch 61 is provided in the conductor 50 connecting the protective resistor 53 and the high-side output transistor 46. The second switch 62 is provided in the conductor 501 connecting the protective resistor 53 and the low-side output transistor 47. The first switch 61 and the second switch 62 may be semiconductor switches such as FETs or mechanical switches, which conduct or shut off the currents flowing in the conductors 50 and 501. The comparator circuit 60 outputs a signal, which turns off the first switch 61 and the second switch 62, when the output voltage of the voltage output circuit 59 is higher than the reference voltage Vr. The comparison circuit 60 outputs a signal, which turns on the first switch 61 and the second switch 62, when the output voltage of the voltage output circuit 59 is lower than the reference voltage Vr. The comparator circuit 60, the first switch 61 and the second switch 62 form a current shut-off circuit, which operates as the protection circuit.

According to the first embodiment, when the output terminal 31 of the magnetic detector module 2 and the motor terminal 35 short and the abnormal voltage of about 12 V is applied to the output terminal 31, current flows from the output terminal 31 to the power supply terminal 48 side and the ground 49 side through the output conductor 51 and the conductors 50, 501. The voltage output circuit 59 detects the voltage applied to the high-side output transistor 46. When the output voltage is higher than the reference voltage Vr, the comparator circuit 60 turns off the first switch 61 and the second switch 62. Thus, electric conduction between the protective resistor 53 and the high-side output transistor 46 is shut off. Further, electric conduction between the protective resistor 53 and the low-side output transistor 47 is also shut-off. As a result, when the abnormal voltage is applied to the output terminal 31, the high-side output transistor 46, the low-side output transistor 47, the control circuits 44, 45 and the like can be protected surely.

Since the current shut-off circuit operates as describe above, the arrangement of the terminals 31 to 34 can be more freely determined in the connector in case that the output terminals 31 of the magnetic detector modules 2 and the motor terminal 35 are arranged within the same connector part 37. Thus, the terminals 31 to 34 can be arranged with less limitation to be resin-molded in the cover 9. As a result, the two magnetic detector modules 2 can be arranged with less limitation in the magnetic detector part 26 of the electronic throttle apparatus 1.

According to the first embodiment, the current is detected in the conductor 50, which is closer to the high-side output transistor 46 than the protective resistor 53 is to the high-side output transistor 46. It is thus possible to detect accurately the voltage applied to the high-side output transistor 46. The reference voltage Vr is set to the value, which is lower than the withstand voltages of the high-side output transistor 46 and the low-side output transistor 47 by the predetermined margin. It is thus possible to protect surely the high-side output transistor 46, the low-side output transistor 47, the control circuits 44, 45 and the like.

(Second Embodiment)

Figure 6:
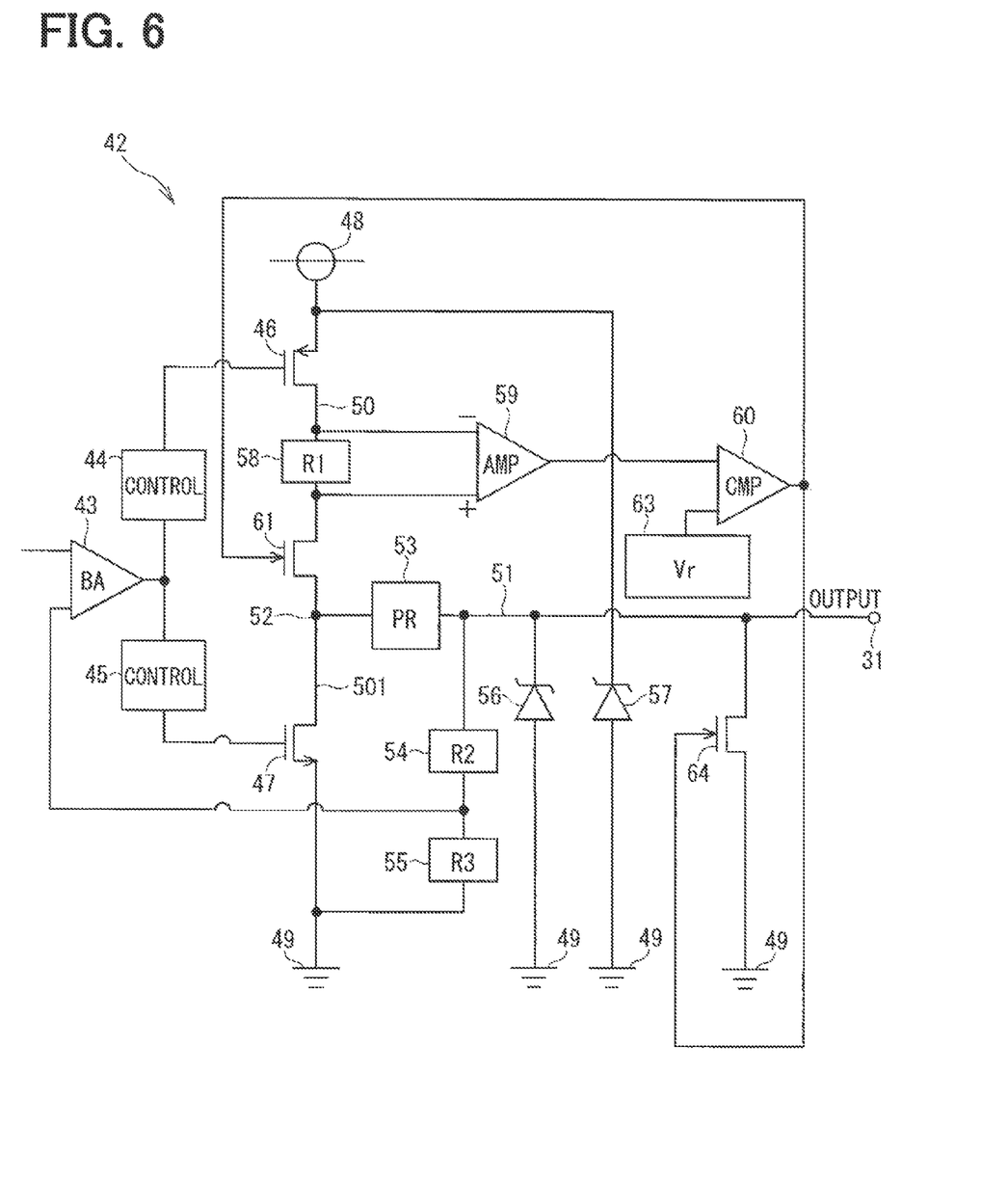
FIG. 6 is a circuit diagram of an output circuit of a position detecting device according to a second embodiment.

According to a second embodiment, the output circuit 42 of the magnetic detector module 2 is configured as shown in FIG. 6.

In the second embodiment, a third switch 64 is provided as an output switch between the output terminal 31 and the ground 49, that is, in a conductor connecting the output conductor 51 and the ground 49. The second switch 62 of the first embodiment is not provided. The voltage applied from the output terminal 31 side to the high-side output transistor 46 is detected by the first resistor 58 and the voltage output circuit 59. The comparator circuit 60 turns on the first switch 61 and turns off the third switch 64, when the output voltage of the voltage output circuit 59 is lower than the reference voltage Vr. Thus, as long as the magnetic detector module 2 operates normally, the electric conduction between the output conductor 51 and the ground 49 is shut off so that the output terminal 31 outputs the normal voltage. The comparator circuit 60 turns off the first switch 61 and turns on the third switch 64, when the output voltage of the voltage output circuit 59 is higher than the reference voltage Vr. Thus, the output conductor 51 is conducted to the ground 49 so that the current flows from the output terminal 31 to the ground 49 through the third switch 64. Since the electric conduction between the protective resistor 53 and the high-side output transistor 46 is shut off, the high-side output transistor 46 is protected from being subjected to a voltage, which is higher than its withstand voltage. It is thus possible to protect the high-side output transistor 46, the low-side output transistor 47, the control circuits 44, 45 and the like from the abnormal voltage applied to the output terminal 31.

(Third Embodiment)

Figure 7:
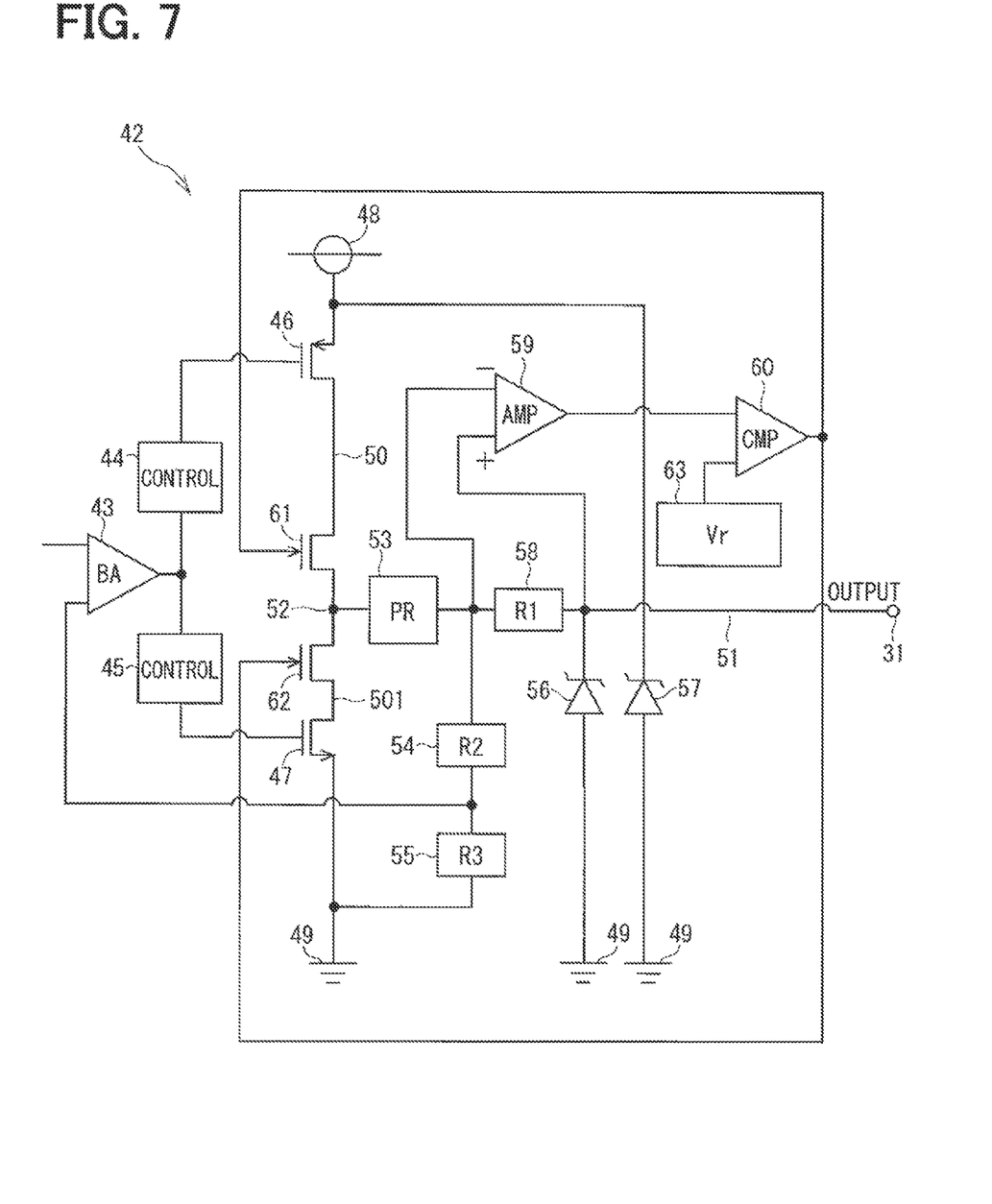
FIG. 7 is a circuit diagram of an output circuit of a position detecting device according to a third embodiment.

According to a third embodiment, the output circuit 42 of the magnetic detector module 2 is configured as shown in FIG. 7.

In the third embodiment, the first resistor 58 is provided in the output conductor 51 between the protective resistor 53 and the output terminal 31. When the abnormal voltage is applied to the output terminal 31, the first resistor 58 and the voltage output circuit 59 detect the voltage applied to the high-side output transistor 46 and the low-side output transistor 47. The comparator circuit 60 turns off the first switch 61 and the second switch 62, when the output voltage of the voltage output circuit 59 is lower than the reference voltage Vr. Thus, the electric conduction between the protective resistor 53 and the high-side output transistor 46 is shut off and the electric conduction between the protective resistor 53 and the low-side output transistor 47 is shut off. As a result, the magnetic detector module 2 can protect the high-side output transistor 46, the low-side output transistor 47, the control circuits 44, 45 and the like when the abnormal voltage is applied to the output terminal 31.

(Other Embodiments)

The above-described embodiments are described with reference to the magnetic detector module 2, which forms the rotation angle sensor used in the electronic throttle apparatus mounted in the vehicle. However the position detecting device can be used in a variety of sensors, which detect a rotation angle of an accelerator pedal of an accelerator apparatus, a rotation angle of a tumble control valve or a stroke of a clutch actuator. The position detecting device is not limited to the magnetic type but may be other types such as an optical type.

What is claimed is:

1. A position detecting device for detecting a position of a movable body, the position detecting device comprising:
a detector element that outputs a signal varying with movement of the movable body;
a signal processing circuit that processes the signal outputted from the detector element; and
an output circuit that outputs a signal from an output terminal based on a signal outputted from the signal processing circuit,
wherein the output circuit includes
an output transistor that is connected in series in a conductor connecting a power supply terminal and ground and controls a voltage of the conductor to be outputted from the output terminal,
a control circuit that controls the output transistor based on the signal outputted from the signal processing circuit,
an output conductor that has one end connected to the conductor including the output transistor therein and an other end connected to the output terminal,
a voltage detection circuit that detects a voltage applied from the output terminal to the output transistor, and
a current shut-off circuit that shuts off electric conduction between the output terminal and the output transistor, when the voltage detection circuit detects that a voltage higher than a withstand voltage of the output transistor is applied to the output transistor.

2. The position detecting device according to claim 1, wherein:
the voltage detection circuit includes a first resistor provided in a conductor connecting the output terminal and the output transistor and a voltage output circuit for outputting a voltage applied to the output transistor as a detection voltage based on a potential difference between ends of the first resistor; and
the current shut-off circuit includes a comparator circuit for comparing the detection voltage of the voltage output circuit with a reference voltage set to be lower than a withstand voltage of the output transistor, and a switch that conducts and shuts off the output transistor and the output terminal when the detection voltage of the voltage output circuit is lower and higher than the reference voltage, respectively.

3. The position detecting device according to claim 2, wherein:
the output circuit includes a protective resistor provided in the output conductor; and
the voltage detection circuit has the first resistor between the protective resistor and the output transistor thereby to detect the voltage applied from the protective resistor to the output transistor.

4. The position detecting device according to claim 3, wherein:
the output transistor includes a high-side output transistor, which is provided between the power supply terminal and the output conductor, and a low-side output transistor, which is provided between the output conductor and the ground;
the switch includes a first switch, which is provided between the protective resistor and the high-side output transistor, and a second switch, which is provided between the protective resistor and the low-side output transistor; and
the comparator circuit turns on and off the first switch when the detection voltage of the voltage output circuit is lower and higher than a reference voltage, respectively.

5. The position detecting device according to claim 4, wherein:
the comparator turns on and off the second switch when the detection voltage of the voltage output circuit is lower and higher than the reference voltage, respectively.

6. The position detecting device according to claim 2, wherein:
the switch includes an output switch provided between the output conductor and the ground; and
the comparator circuit turns off and on the output switch when the detection voltage of the voltage output circuit is lower and higher than the reference voltage, respectively.

7. The position detecting device according to claim 1, wherein:
the detector element includes a magnetic element, which outputs the signal varying in accordance with density of magnetic flux generated by a magnetic generator attached to the movable body; and
the output terminal is arranged as one of a plurality of electric terminals in a connector to connectable to an electronic control unit.

* * * * *